United States Patent
Bernstein et al.

(10) Patent No.: US 9,292,408 B2
(45) Date of Patent: Mar. 22, 2016

(54) AUTOMATED DETECTION OF A SYSTEM ANOMALY

(75) Inventors: Ruth Bernstein, Kiryat Ono (IL); Ira Cohen, Reut (IL); Eran Samuni, Ramat Gan (IL)

(73) Assignee: Hewlett Packard Enterprise Development LP, Houston, TX (US)

( * ) Notice: Subject to any disclaimer, the term of this patent is extended or adjusted under 35 U.S.C. 154(b) by 103 days.

(21) Appl. No.: 14/342,664

(22) PCT Filed: Sep. 21, 2011

(86) PCT No.: PCT/US2011/052594
§ 371 (c)(1),
(2), (4) Date: Mar. 4, 2014

(87) PCT Pub. No.: WO2013/043170
PCT Pub. Date: Mar. 28, 2013

(65) Prior Publication Data
US 2014/0229768 A1    Aug. 14, 2014

(51) Int. Cl.
*G06F 11/00* (2006.01)
*G06F 11/34* (2006.01)
(Continued)

(52) U.S. Cl.
CPC .......... *G06F 11/3495* (2013.01); *G06F 11/079* (2013.01); *G06F 11/0709* (2013.01); *H04L 41/065* (2013.01); *H04L 43/08* (2013.01); *H04L 43/16* (2013.01); *G06F 11/3419* (2013.01)

(58) Field of Classification Search
CPC .................................................. G06F 11/3495
USPC ............. 714/33, 25, 47.1, 47.2, 48, 39
See application file for complete search history.

(56) References Cited

U.S. PATENT DOCUMENTS

| | | | |
|---|---|---|---|
| 7,346,803 B2 * | 3/2008 | Ide | G06F 11/0709 714/38.13 |
| 7,783,745 B1 * | 8/2010 | Bhargava | G06Q 10/06 709/224 |

(Continued)

FOREIGN PATENT DOCUMENTS

| | | |
|---|---|---|
| CA | 2535198 A1 | 8/2006 |
| CN | 101854263 A | 10/2010 |
| WO | WO-0233980 A2 | 4/2002 |

OTHER PUBLICATIONS

Chengwei Wang et al., "Statistical Techniques for Online Anomaly Detection in Data Centers", IFIP/IEEE International Symposium on Integrated Network Management (1M), May 23-27, 2011.

(Continued)

*Primary Examiner* — Dieu-Minh Le
(74) *Attorney, Agent, or Firm* — Hewlett Packard Enterprise Patent Department

(57) ABSTRACT

A method for automated detection of a real IT system problem may include obtaining monitor measurements of metrics associated with activities of a plurality of configuration items of the IT system. The method may also include detecting anomalies in the monitor measurements. The method may further include grouping concurrent anomalies of the detected anomalies corresponding to configuration items of the plurality of configuration items which are topologically linked to be regarded as a system anomaly. The method may further include calculating a significance score for the system anomaly, and determining that the system anomaly relates to a real system problem based on the calculated significance score.

18 Claims, 4 Drawing Sheets

(51) Int. Cl.
*G06F 11/07* (2006.01)
*H04L 12/26* (2006.01)
*H04L 12/24* (2006.01)

(56) References Cited

U.S. PATENT DOCUMENTS

| | | | |
|---|---|---|---|
| 2005/0246350 A1 | 11/2005 | Canaran | |
| 2006/0161592 A1* | 7/2006 | Ertoz | G06F 21/552 |
| 2008/0215576 A1* | 9/2008 | Zhao | G06F 17/30702 |
| 2008/0250497 A1 | 10/2008 | Mullarkey et al. | |
| 2011/0185422 A1* | 7/2011 | Khayam | H04L 63/1425 726/23 |

OTHER PUBLICATIONS

Korean Intellectual Property Office, International Search Report and Written Opinion, Mar. 2, 2012, 9 pages, Daejeon, Republic of Korea.

L. Lawrence Ho et al., "Adaptive & Automated Detection of Service Anomalies in Transaction Oriented Wan's: Network Analysis, Algorithms, Implementation, & Deployment", IEEE Journal of Selected Areas in Communications, vol. 18, No. 5, May 2000, pp. 744-757.

Vasilios A. Siris et al., "Application of Anomaly Detection Algorithms for Detecting SYN Flooding Attacks", Institute of Computer Science, Foundation for Research & Technology, Greece (publication date not available).

Alsubhi K et al: "Aler prioritization in Intrusion Detection Systems", Network operations and Management Symposium, 2008. NOMS 2008. IEEE, IEEE, Piscataway, NJ, USA, Apr. 7, 2008, pp. 33-40, XP031290498.

Bruno B Zarpelao et al: "Three levels network analysis for anomaly detection", software, telecommunications&computer networks, 2009. softcom 2009. 17th international conference on IEEE piscataway NJ USA Sep. 24, 2009 6 cages.

* cited by examiner obtain monitor measurements of metrics associated with activities of a plurality of configuration items of the IT system
202

Detect anomalies
204

Group concurrent anomalies corresponding to CI which are topographically linked
206

Calculating a significance score for the system anomaly
208

Determine that the system anomaly is a real system Problem based on the calculated significance score
210

AUTOMATED DETECTION OF A SYSTEM ANOMALY

BACKGROUND

Many business organizations invest a substantial effort in monitoring their Information Technology (IT) system (hereinafter—IT system) to ensure high-quality service and to promote positive user experience.

Monitoring of an IT system may be done, for example, by employing a load simulator, such as, for example, LoadRunner™ by Hewlett-Packard Company (HP), which simulates loads on the system by generating loads inflicted by virtual users in order to examine system behavior and performance and studying the system response to these loads.

Another approach to monitoring an IT system, which is embedded in Business Service Management (BSM), involves real user monitoring as well as virtual user monitoring. Real user monitoring allows monitoring performance and behavior of the IT system when real users are interacting with the system, in real-time, and identify slowdowns or other anomalies in the system.

Virtual user monitoring may be used in order to provide information about the IT system performance when real users are not using the system (for example, during off hours). This provides early identification of slowdowns, before real users begin to experience the problem.

IT operators monitoring IT systems are aimed at identifying such anomalies, understanding their origins and fix them.

IT system monitoring typically involves collecting measurements from a vast number of monitors that monitor various parameters (referred to as "metrics") related to system elements which are usually referred to as configuration items, or CIs.

There are known monitoring applications that provide IT operators with a topological representation of the monitored IT system, where the IT system is represented by a graph, with the CIs located at nodes of the graph that are connected by arcs which indicate the relations between the connected nodes.

BRIEF DESCRIPTION OF THE DRAWINGS

Embodiments of the present invention are described in the following detailed description and illustrated in the accompanying drawings in which:

FIG. 2 illustrates a flow-chart of a process of automated detection of a real system problem, in accordance with an example, of the present invention.

DETAILED DESCRIPTION

Figure 1:
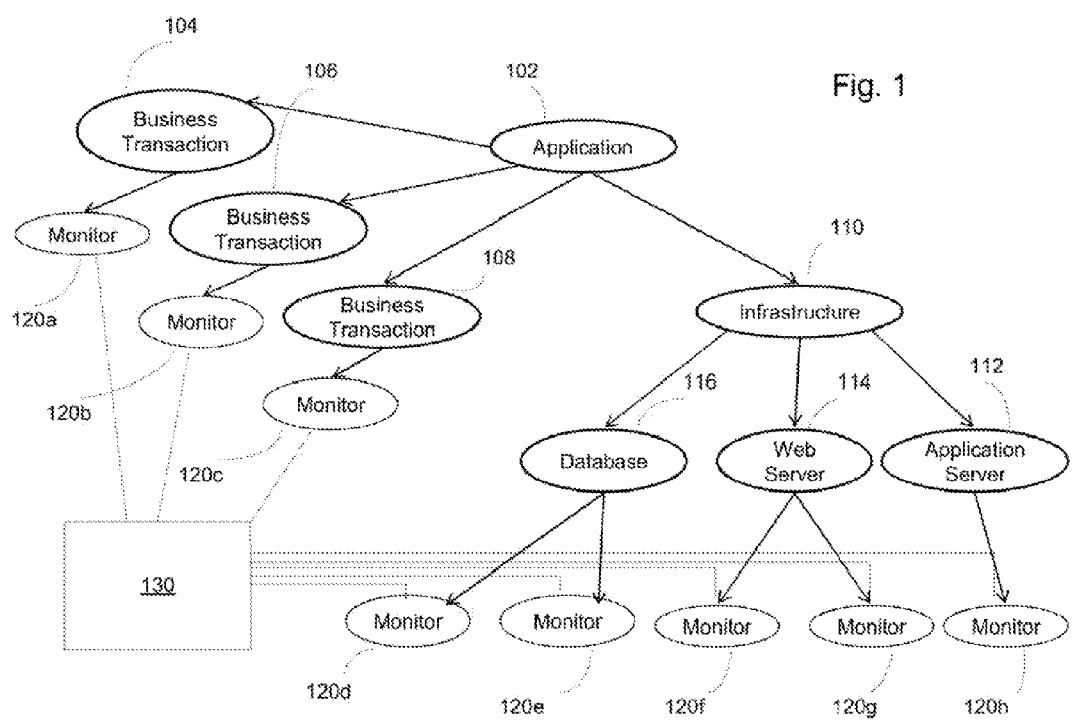
FIG. 1 illustrates an IT system which is monitored for automated detection of a real system problem, in accordance with an example of the present invention.

FIG. 1 illustrates an IT system which is monitored for automated detection of a real system problem, in accordance with an example of the present invention.

IT system 102 (an application in this example) may be graphically represented in the form of a topological graph, which may include various CIs 104, 106, 110, 112, 114 and 116 (in some examples of the present invention monitors 120a-h may also be considered as CIs) which are located at nodes (bubbles) which are connected by arcs (lines) representing the relations between the nodes. System 102 may include, for example, infrastructure 110, which may include, for example, database 116, web server 114, and application server 112. System 102 may facilitate the concurrent execution of several business transactions, 104, 106 and 108, each transaction related to a user (different users or the same user).

Monitors 120a-h may be used monitor measurements of metrics associated with the activities of various CIs of the system. For example, monitors 120a, 120b and 120c may, each, measure metrics associated with the activities of business transactions 104, 106 and 108, respectively. For example, monitor measurements for a business transaction (e.g. accessing a page) may include a total response time (e.g. the time from the instance the user has logged in and the instance the page was displayed on the display device of the user), and also user time (e.g. the time from the instance the user device received the user's log-in information until the instance the user device has issued an access request to the remote server on which the page is hosted), network time (which is the time it took for the issued access request to reach the server), and server time (e.g. the time it took the server to process the access request before it was displayed to the user). Each Transaction CI (104, 106, 108) may be monitored by several monitors which provide these monitor measurements.

There may be more than one monitor assigned to measure metrics related to a single CI, as demonstrated by monitors 120d and 120e that measure metrics of database 116, and by monitors 120f and 120g that measure metrics of web server 114. Monitor 120h measures metrics of application server 112.

All monitors may be connected to monitoring module 130, which may receive monitor measurement information from monitors 120a-h, and analyze this information to automatically detect a system anomaly, which may affect the performance of the system, by following a method for automated detection of a system anomaly, in accordance with an example of the present invention.

The monitor measurements of the metrics associated with monitors 120a-h may be first studied to determine a baseline for each metric. This is done to ascertain the standard "normal" pattern of the monitor measurements (metric events) for each of the metrics. This may be carried out over time. In the establishment of the baseline for each metric a statistical algorithm may be used, such as, for example, Holt-Winters algorithm, estimation of average and standard deviations, time series based statistics estimation accounting for trend and seasonal behavior.

Once the baseline for each metric is established, it may be possible to detect anomalies. The baseline may be, in some examples a threshold value for the monitored metric or a range of values within which the monitored metric is assumed to be "normal".

According to an example of the present invention, a "Baseline Confidence" value may further be calculated for each metric. This value represents the probability of the monitor measurements of a metric to be associated with "normal" metric events for that metric. Thus, the complementary value, which is 1 minus the Baseline Confidence value, represents the probability of the monitor measurements of a metric to be associated with abnormal metric events (also referred to as "anomalies"). The complementary value is hereinafter referred to as "Abnormal Probability".

After establishing baselines for each of the monitored metrics, anomalies may be detected by referring to the baselines and looking for monitor measurements of metrics that stray from their baseline. The metric events may be traced over time. Once it is established that a metric is experiencing continuous abnormal behavior (anomalies which are continuous over time), that metric may be classified as "Continuously Abnormal". According to an example of the present invention Continuously Abnormal metrics are considered as anomalies, which may be grouped together, by referring to concurrent anomalies relating to CIs which are topologically linked as a system anomaly. For example, if two metrics begin exhibiting anomalies within a specific time range, and these two anomalies relate to the same CI or to CIs which are topologically linked in the topological graph, then the two metrics may be grouped together and classified as a single system anomaly. "Topologically linked" refers to CIs which have a path of one or more arcs between them on the topological graph representing the system. "Concurrent anomalies" refer to anomalies which are fully, or partially overlapping in time, or occur within a predetermined period of time.

Next, a "significance" score of h system anomaly may be calculated.

To calculate the significance score of a system anomaly, the conditional probability of occurrence the metric events (whether abnormal or normal), as these occurred, for each of the metrics which were classified as relating to a single system anomaly, assuming that there is no real problem in the IT system. After calculating this probability, the complementary probability may be calculated, which represents the probability of occurrence these metric events not by chance, i.e. the probability that the system anomaly does indeed represent a real system problem. A "real system problem" refers to a situation in which the system anomaly may affect the performance of the system and may require active involvement of IT technicians or other professionals to fix the problem.

In order to determine whether a system anomaly is "Significant", a significance threshold may be used, in determining what would be considered as a "high" significance score see in the calculation example hereinafter).

If the significance score for that system anomaly breaches the significance threshold, this system anomaly may be classified as a real system problem. In some examples of the invention, the system anomaly that was classified as a real system problem may be reported to an IT operator. In some examples of the invention, an alarm may be issued, such as in the form of an audio signal, a video signal or a combination of both, using, for example, using a display device for displaying the video signal, or an audio signal generator (e.g. loudspeaker) for issuing the audio signal. In some examples, the system anomaly that was classified as a real system problem may be logged and a written report may be issued and forwarded to an IT operator.

In the calculation of the significance threshold, a "sensitivity" level may be considered, so as to allow different levels of false alarm reduction.

An example of an algorithm for calculation of the significance score for a system anomaly is detailed hereinafter.

The following parameters are used as input:

1. The metric events for each of metrics related to the system anomaly, and the corresponding CIs to these metrics;
2. Abnormal Probability values for the metric events. A value in the range between 0 and 1 for each metric representing the probability of the metric events relating to a real system problem.

The calculated output is a significance score of the system anomaly, a value in the range between 0 and 1.

In the calculation of the significance score the following parameters may be considered:

1. minNumOfCIs: refers to the minimal number of CIs expected in a significant system anomaly, used as a base for a log function;
2. minNumOfMetrics: refers to the minimal number of metrics expected in a significant system anomaly, used as a base for a log function;
3. abnormalityMeasureLogBase: refers to the log base for a calculated "abnormality measure";
4. abnormalWeight: refers to weight of an anomaly in relation to normal metric events.

maxAbnormalProbability, which refers to the maximal Abnormal Probability for the measured metric events. Metrics with a higher Abnormal Probability value are not taken into account in the calculation.

Hereinafter follows the algorithm itself:

Let A be the system anomaly

Let CIs be the set of CIs of system anomaly A

Let #CIs be the number of CIs of system anomaly A (size of CIs)

Let c be the number of CIs log base (parameter minNumOfCIs)

Let Met(CIj) be the set of metrics of CI with index j

Let #Met(CIj) be the number of metrics of CI with index

Let Mji be the metric i of CIj

Let #MetTotal be the total number of metrics associated with the system anomaly

Let m be the total number of metrics log base (parameter minNumOfMetrics)

Let S be the Si Significance score

Let AP(Mij) be the Abnormal Probability of Mij

Let TransformedAP(Mij) be the transformed Abnormal Probability of Mij

Let #Aij be the number of anomalies of Mij

Let #Nij be the number of normal metric events of Mij

Let a be the abnormality measure log base (abnormalityMeasureLogBase)

Let w be the weight of an anomaly in relation to normal metric events (abnormalWeight)

Normalize the Abnormal Probability value of each metric. Abnormal Probability values in given input are assumed to be in the range between 0 and maxAbnormalProbability. The original Abnormal Probability values are transformed to be within the range [0,0.9999]

Calculate the probability of Mij exhibiting abnormal behavior incidentally as follows:

$$P(Mji) = \text{TransformedAP}(Mij)^{\text{log-base-}a(\#Aij+1-\#Nij/w)}$$

Calculate the probability of CIj exhibiting abnormal behavior incidentally as follows:

$$P(CIj) = 1/\#Met(CIj) * \text{Sigma}[P(Mji)^{\text{log-base-}m(\#Met\text{Total})}]$$

Calculate the probability of A exhibiting abnormal behavior incidentally as follows:

$$P(A) = 1/\#CIs * \text{Sigma}[P(CIj)^{\text{log-base-}c(\#CIs)}]$$

Calculate the Significance Score as the probability of A exhibiting abnormal behavior due to a real system problem:

$$S(A) = 1 - P(A)$$

After calculating the significance score a significance threshold for the Significance Score may be calculated, for example as described hereinafter:

The following parameters are considered for input.

1. Sensitivity: refers to the sensitivity level for determining a breach of the significance threshold, and is an integer in the range between 1 to 10;

2. maxAbnormalProbability: refers to the maximal metric Abnormal Probability value to be taken into account in the calculations.

The output: Significance Threshold, which is a number in the range between 0 and 1.

An example of n algorithm for calculating Significance Threshold follows:

Use minBaselineConfidence as the minimum for the Significance Threshold: minBaselineConfidence=1−maxAbnormalProbability Significance Threshold=minBaselineConfidence+(sensitivity−1)*(1−minBaselineConfidence)/10;

According to examples of the present invention, an anomaly significance score which was calculated hereinabove and which was found to breach the Significance Threshold may be transformed from the range SignificanceThreshold to 1 to the range 0 to 1 to better differentiate between Significance Scores and allow further anomaly filtering, if necessary (for greater false alarm reduction).

A linear transformation of the values may be used. The values which result from this transformation may then be taken in the power of "exp" parameter. The power function allows for a greater differentiation between the original values.

For example, the following algorithm may be considered, with the following parameters as input:

1. Significance Score, which is a value in the range between SignificanceThreshold and 1;
2. Significance Threshold, which is a value in the range between 0 and 1.

The planned output is: TransformedSignificance Score, which is a value in the range 0 to 1.

The Parameter considered or this algorithm: exp is an odd number equal to or greater than 5.

Then, the following calculation is made: Transformed Significance Score=[(Significance Score−Significance Threshold)/(1−Significance Threshold)]^exp.

Generally speaking, the significance score is influenced by the number of monitors, number of anomalies for each monitor, number of normal metric events for each monitor, the probability of a monitor to be experiencing abnormal behavior (anomalies), number of CIs.

It is noted that the above algorithms are given as examples only, and other algorithms may be used.

FIG. 2 illustrates a flow-chart of a process of automated detection of a real system problem, in accordance with an example, of the present invention.

In its general form, method 200 may include obtaining 202 monitor measurements of metrics associated with activities of a plurality of configuration items of the IT system. The method may also include detecting 204 anomalies in the measurements. The method may further include grouping 206 concurrent anomalies of the detected anomalies corresponding to configuration items of the plurality of configuration items which are topologically linked to be regarded as a system anomaly. The method may also include calculating 208 a significance score for the system anomaly; and determining 210 that the system anomaly relates to a real system problem based on the calculated significance score.

Figure 3:
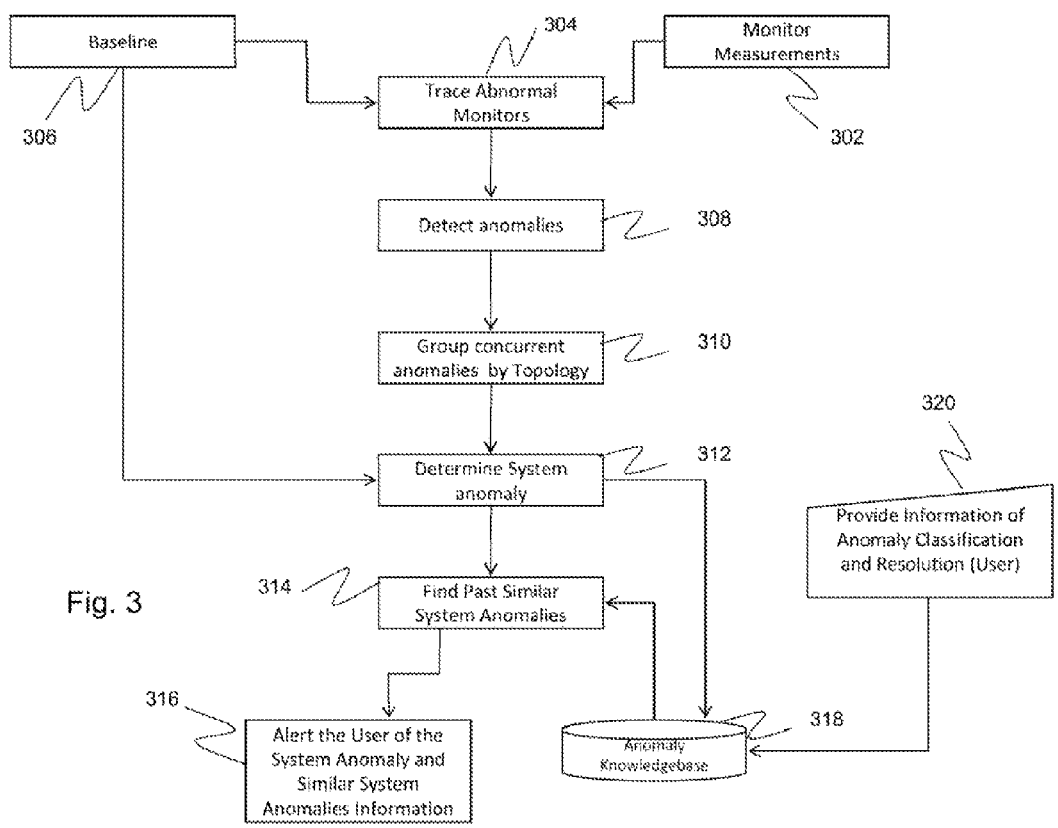
FIG. 3 illustrates a method for automated detection of a real system problem, in accordance with an example of the present invention.

FIG. 3 illustrates a method for automated detection of a real system problem, in accordance with an example of the present invention.

Such a process may begin by establishing a baseline 306 for each of the monitors, by tracking the behavior of the monitors over a period of time and learning their "normal" behavior.

After the baseline is established the metrics from the various monitors of the IT system are monitored 302 and anomalies are detected 308.

Assuming that not all abnormal monitor readings are indicative of a real problem, concurrent anomalies are grouped 310 based on the topology of the IT system.

Then, the continuously abnormal monitor readings are analyzed to detect 312 a system anomaly, by referring to baseline 306. The system anomaly may be reported to a user (e.g. in the form of an alert, that includes information on the significant anomaly). The significant anomaly may also be reported to an anomaly knowledgebase 318 and information on the system anomaly may be saved for future reference. A user (e.g. IT operator) may provide 320 information on anomaly classification and resolution.

The monitoring process may be carried out over a period of time, so that next time a system anomaly is detected 312, the anomaly knowledgebase is referred to 318, to find past similar system anomalies 314.

If past similar system anomaly is found then the user may be alerted 316 on the existence of a recurring significant system anomaly suspected as a real system anomaly, e.g. by providing the user with information on the significant anomalies (e.g. identification of the abnormal monitors associated with significant anomaly) and similar anomaly information (e.g. identification of the abnormal monitors associated with the past significant anomaly) and similar anomaly classification and resolution.

Figure 4:
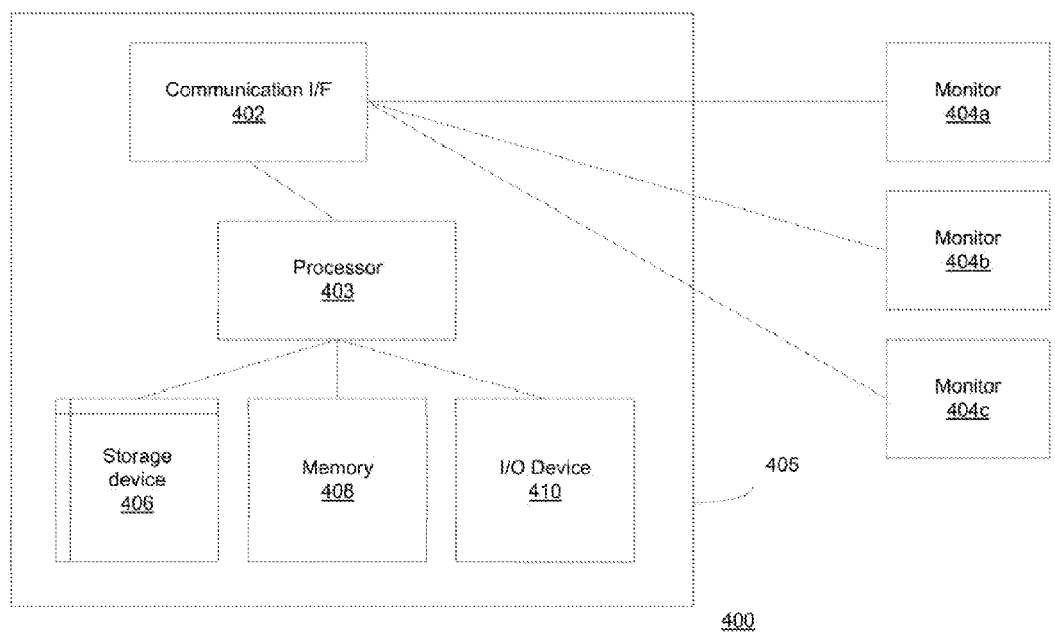
FIG. 4 illustrates an apparatus for automated detection of a real system problem, in accordance with an example of the present invention.

FIG. 4 illustrates an apparatus for automated detection of a real system problem, in accordance with an example of the present invention. Apparatus 400 may include a plurality of monitors 404a, 404b and 404c that measure activities of a plurality of configuration items of an IT system. Apparatus 400 may also include a monitor module 405 (see also 130 in FIG. 1) which includes a communication interface (I/F) 404 for interfacing communications between the monitors 404a, 04b and 04c and processor 403. Processor 403 may be designed to track the monitors, to detect anomalies in the measured activities, to group anomalies of the detected anomalies which are topologically linked, to calculate a significance score of the grouped anomalies, and to determine that a grouped anomaly of the grouped anomalies is a real system anomaly based on the calculated significance score.

Storage device 406, such as, for example, a hard disk, or any other non-transitory computer readable medium may be used to store a program that includes instructions executable by the processor for automated detection of a system anomaly, in accordance with examples of the present invention.

Memory 408 may be provided for storing temporal information in the course of execution of such program.

Input/Output (I/O) device 410 may be provided, such as for example one or more devices selected from the group of device including keyboard, pointing device, touch-sensitive screen, display device, printer, audio signal generator, so as to allow a user to input information and/or commands and to allow outputting information, such as alerts, audio signals, video information etc.

Aspects of the invention may be embodied in the form of a system, a method or a computer program product. Similarly, aspects of the invention may be embodied as hardware, software or a combination of both. Aspects of the invention may be embodied as a computer program product saved on one or more non-transitory computer readable medium (or mediums) in the form of computer readable program code embodied thereon. Such non-transitory computer readable medium may include instructions that when executed cause a processor to execute method steps in accordance with embodiments of the present invention. In some embodiments of the present invention the instructions stores on the computer readable medium may be in the form of an installed application and in the form of an installation package.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer, or on a plurality of computers.

Aspects of the invention are described hereinabove with reference to flowcharts and/or block diagrams depicting methods, systems and computer program products according to embodiments of the invention.

What is claimed is:

1. A method for automated detection of a real IT system problem, the method comprising:
    obtaining monitor measurements of metrics associated with activities of a plurality of configuration items of the IT system;
    detecting anomalies in the monitor measurements;
    identifying at least two anomalies as concurrent anomalies that occur within a predetermined period of time;
    determining that the concurrent anomalies correspond to configuration items, of the plurality of configuration items, wherein the configuration items are topologically linked;
    grouping the concurrent anomalies to be regarded as a single system anomaly;
    calculating a significance score for the system anomaly; and
    determining that the system anomaly relates to a real system problem based on the calculated significance score.

2. The method of claim 1, wherein the detection of anomalies in the monitor measurements is based on an established baseline for each of the metrics.

3. The method of claim 1, further comprising saving information on real system anomalies in an anomaly knowledgebase for future reference.

4. The method of claim 3, further comprising searching the anomaly knowledgebase to find past similar significant anomalies.

5. The method of claim 1, further comprising alerting a user of the determining of the real system problem.

6. The method of claim 1, further comprising referring to a threshold in the calculation of the significance score of the grouped anomalies.

7. The system of claim 1, wherein the predetermined period of time is a fully overlapping period of time.

8. The system of claim 1, wherein the predetermined period of time is a partially overlapping period of time.

9. A non-transitory computer readable medium having stored thereon instructions that when executed by a processor will cause the processor to perform the method of:
    obtaining monitor measurements of metrics associated with activities of a plurality of configuration items of the IT system and establishing a baseline for each of the metrics;
    detecting anomalies in the monitor measurements by referring to the baseline for each of the metrics;
    identifying at least two anomalies as concurrent anomalies that occur within a predetermined period of time;
    determining that the concurrent anomalies correspond to configuration items, of the plurality of configuration items, wherein the configuration items are topologically linked;
    grouping the concurrent anomalies to be regarded as a single system anomaly;
    calculating a significance score for the system anomaly; and
    determining that the system anomaly relates to a real system problem based on the calculated significance score.

10. The non-transitory computer readable medium of claim 9, wherein the baseline is determined over time.

11. The non-transitory computer readable medium of claim 9, wherein the calculation of the significance score includes using one or more of the parameters selected from the group consisting of a minimal number of configuration items of the plurality of configuration items expected in a significant system anomaly, a minimal number of metrics expected in a significant system anomaly, abnormality measure, and weight of an anomaly in relation to normal metric events.

12. The non-transitory computer readable medium of claim 11, wherein the abnormality measure represents a probability of the concurrent anomalies relating to a real system problem.

13. The non-transitory computer readable medium of claim 9, wherein instructions further comprise saving information on real system anomalies in an anomaly knowledgebase for future reference.

14. An system for automated detection of a real IT system problem, the system comprising:
    a plurality of monitors to obtain monitor measurements of metrics associated with activities of a plurality of configuration items of the IT system;
    a processor for detecting anomalies in the monitor measurements, identifying at least two anomalies as concurrent anomalies that occur within a predetermined period of time, determining that the concurrent anomalies correspond to configuration items, of the plurality of configuration items, wherein the configuration items are topologically linked; grouping the concurrent anomalies to be regarded as a single system anomaly, calculating a significance score for the system anomaly; and determining that the system anomaly relates to a real system problem based on the calculated significance score.

15. The system of claim 14, wherein the detection of anomalies in the monitor measurements is based on an established baseline for each of the metrics.

16. The system of claim 14, wherein the processor is designed to save information on real system anomalies in an anomaly knowledgebase for future reference.

17. The system of claim 16, wherein the processor is designed to search the anomaly knowledgebase to find past similar significant anomalies.

18. The system of claim 14, further comprising alerting a user of the detection of the system anomaly.

* * * * *